1. United States Patent [19]

Steigerwald et al.

[11] Patent Number: 4,685,040
[45] Date of Patent: Aug. 4, 1987

[54] INTEGRATED CIRCUIT FOR CONTROLLING POWER CONVERTER BY FREQUENCY MODULATION AND PULSE WIDTH MODULATION

[75] Inventors: Robert L. Steigerwald, Scotia, N.Y.; Keku M. Mistry, Shalimar, Fla.

[73] Assignee: General Electric Company, Schenectady, N.Y.

[21] Appl. No.: 805,651

[22] Filed: Dec. 6, 1985

[51] Int. Cl.⁴ .......................................... H02M 3/337
[52] U.S. Cl. ........................................ 363/17; 363/56; 363/98
[58] Field of Search ....................... 363/17, 21, 79, 80, 363/97, 98, 56; 307/271, 265

[56] References Cited

U.S. PATENT DOCUMENTS

| 4,266,268 | 5/1981 | Tkacenko | 363/17 |
| 4,494,134 | 1/1985 | Wildi et al. | 357/43 |

FOREIGN PATENT DOCUMENTS

| 142519 | 11/1979 | Japan | 363/21 |
| 77372 | 6/1980 | Japan | 363/21 |
| 97183 | 7/1980 | Japan | 363/21 |
| 907532 | 2/1982 | U.S.S.R. | 363/21 |

OTHER PUBLICATIONS

Wildi et al., *A Highly Integrated 500V/25 A Smart Half Bridge*, ISSCC Conf. (Feb. 1985).
Kohno et al., *Single-Ended DC-to-DC Converter With Two Individually Controlled Outputs*, Fujitsu Scientific and Tech. J. (Mar. 1980).
Deisch, *Simple Switching Control Method Changes Power Converter Into a Current Source*, Power Elec. Spec. Conf. (1978).

*Primary Examiner*—William H. Beha, Jr.
*Attorney, Agent, or Firm*—Marvin Snyder; James C. Davis, Jr.

[57] ABSTRACT

An integrated circuit contains the gate drivers and the control components for constructing a DC power supply in any of the most popular converter topologies. Multi-function elements in the control circuit minimize the area of the chip. The integrated circuit drives both the upper and lower switches of a half-bridge converter and separately regulates two power supply output voltages, one by pulse width modulation and the other by frequency modulation.

10 Claims, 3 Drawing Figures

PRIOR ART Fig.1

INTEGRATED CIRCUIT FOR CONTROLLING POWER CONVERTER BY FREQUENCY MODULATION AND PULSE WIDTH MODULATION

BACKGROUND OF THE INVENTION

The present invention relates in general to controlling DC to DC power converters and more specifically to a circuit design for a single-chip, high-voltage integrated circuit which allows the same chip to be used in essentially all of the most popular power-supply topologies.

DC switching converter power supplies typically are used in such applications as computers, television receivers and electronic lamp ballasts for providing one or more regulated DC voltages. Several types of DC switching converters are employed including forward, flyback and resonant circuit configurations which may be controlled by pulse-width modulation (PWM), by frequency control or by current mode control.

A variety of integrated circuits (ICs) for controlling DC switching converters are available, but none contain the gate driver circuits within the IC itself. Therefore, dedicated drivers are employed using discrete parts, sometimes including coupling transformers, which may be both bulky and expensive. Some of the circuit topologies have not been implemented on ICs at all. Furthermore, none of the presently available control chips may be used in all of the configurations mentioned above.

High voltage integrated circuit (HVIC) technology which accommodates both high and low voltages on a single integrated circuit chip has been employed in a driver circuit for a half-bridge converter. Thus, both a ground referenced switch (or lower switch) and a nonground referenced switch (or upper switch) may be driven from a single integrated circuit.

Accordingly, it is a principal object of the present invention to reduce the cost of DC power supplies by providing a universal control chip adapted for high volume production.

It is another object of the present invention to provide a power-supply control chip containing high voltage gate drivers and a universal control circuit.

It is a further object of the present invention to provide a circuit design for a single-chip integrated circuit for driving the converter switches of and controlling at least one output voltage of a DC to DC converter which minimizes chip size by making multiple use of control circuit elements for different converter topologies.

It is another object of the present invention to provide a power package for operating essentially all of the popular DC to DC converter topologies in either a single-ended or a half-bridge configuration and at a wide variety of power levels.

SUMMARY OF THE INVENTION

These and other objects are achieved by a single-chip integrated circuit for driving the converter switches of and controlling at least one output voltage of a DC to DC converter which comprises a first control loop, a second control loop, logic means and a driver circuit. The first control loop includes a first amplifier, a voltage-controlled oscillator, and connection means for permitting the output of the first amplifier to be coupled to the input of the voltage-controlled oscillator externally of the integrated circuit. The second control loop includes a second amplifier coupled to a first comparator, the first comparator also being coupled to the output of the voltage-controlled oscillator.

The logic means is connected to the first and second control loops for generating a pair of switching signals each having a frequency in accordance with the output signal from the first control loop and having a duty ratio in accordance with the output signal of the second control loop. The driver circuit is coupled to the logic means and has outputs for driving a lower converter switch and an upper converter switch, the driver circuit being adapted to be coupled to an external capacitor for providing a voltage sufficient to drive the upper converter switch.

BRIEF DESCRIPTION OF THE DRAWINGS

The novel features of the invention are set forth with particularity in the appended claims. The invention itself, however, as to organization and method of operation, together with further objects and advantages thereof, may best be understood by reference to the following description taken in conjunction with the accompanying drawings in which:

DETAILED DESCRIPTION OF THE INVENTION

Figure 1:
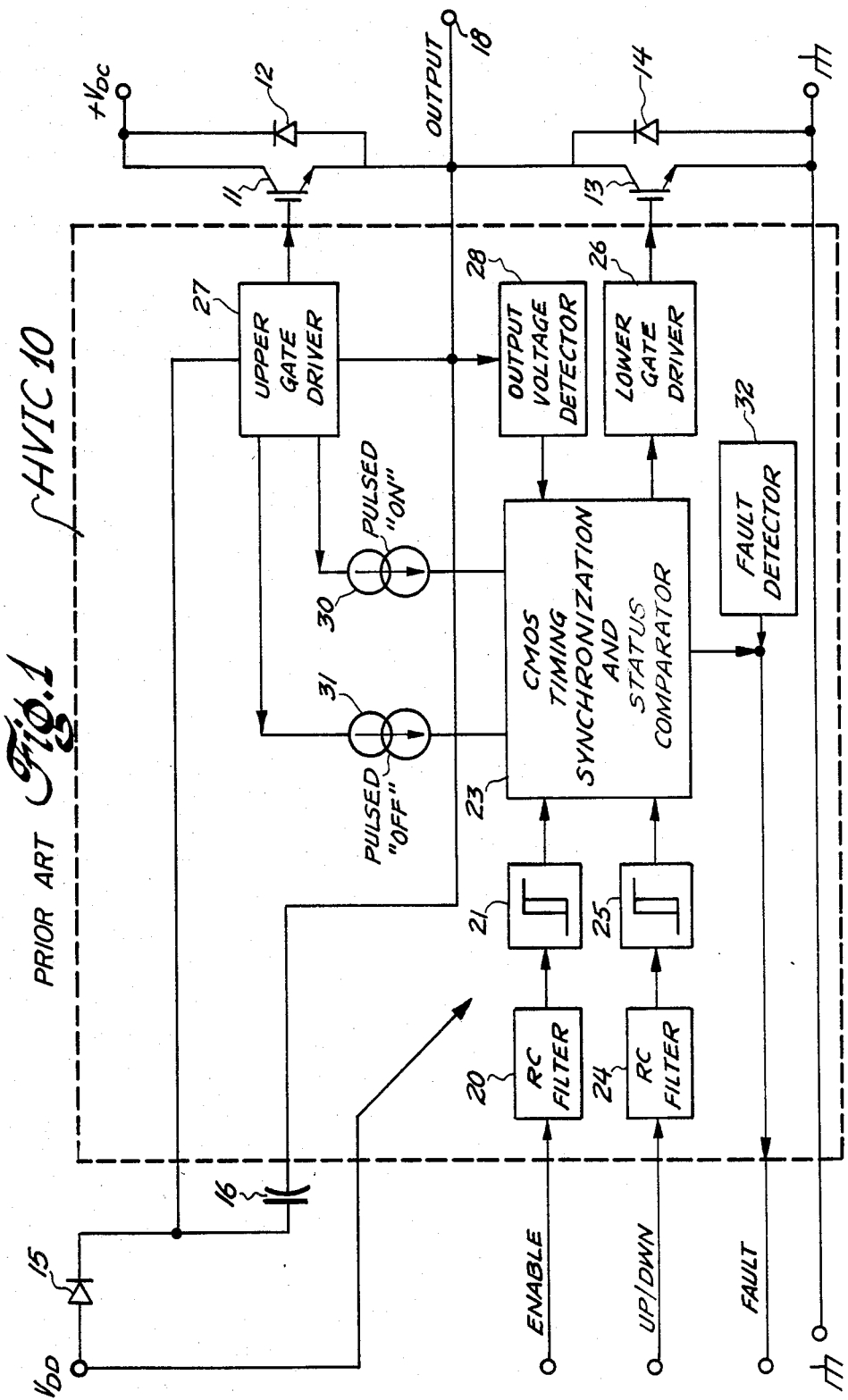
FIG. 1 is a schematic diagram of a known high voltage integrated circuit for driving a half-bridge converter.

Turning now to FIG. 1, a high voltage integrated circuit (HVIC) 10 will be described for driving an upper switch 11 and a lower switch 13 of a half-bridge converter. The circuit of FIG. 1 is the subject of a paper by Wildi et al., *A Highly Integrated 500V/25A Smart Half-Bridge,* ISSCC Conf. (February 1985), which is hereby incorporated by reference.

Semiconductor switches 11 and 13 are connected in series between circuit common and a DC voltage $+V_{DC}$ which typically is in the range of 200 to 600 volts (i.e. a voltage which is higher than the approximately +15 volts widely employed with standard integrated circuits). Thus, the portions of HVIC 10 which drive upper switch 11 will be referenced at voltages higher than those of a standard integrated circuit while the remaining portions of HVIC 10 will be subject to a maximum voltage of only about 15 volts. An area of high voltage can coexist with an area of relatively low voltage on different areas of a single HVIC chip by employing isolation regions, such as those which are the subject of Wildi et al. U.S. Pat. No. 4,494,134, issued Jan. 15, 1985.

Snubber diodes 12 and 14 are connected anti-parallel to switches 11 and 13, respectively. A square wave output voltage is generated at output terminal 18 by alternately turning on switches 11 and 13. Simultaneous conduction of switches 11 and 13 is not allowed since that would result in a short circuit between the $+V_{DC}$ terminal and circuit common. A dead-time may be introduced between alternate switchings so that both switches 11 and 13 are off for a short period (i.e. the dead-time).

HVIC 10 has a supply voltage $V_{DD}$ input, an ENABLE input, an UP/DWN input, a FAULT output and a terminal for connecting to circuit common. A high logic level signal at the ENABLE input allows one of switches 11 and 13 to be turned on. A high level signal at the UP/DWN input causes one of switches 11 or 13 to turn on while a low level signal causes the other of switches 11 and 13 to be the one which is turned on.

The ENABLE and UP/DWN inputs are connected to RC filters 20 and 24, respectively. Schmitt triggers 21 and 25 couple RC filters 20 and 24, respectively, to a timing synchronization and status comparator circuit 23. Schmitt triggers 21 and 25 provide amplitude-level differentiation and waveform sharpening. The function of timing circuit 23 is to coordinate the turn-on and turn-off sequencing of switches 11 and 13 and to verify that the states of switches 11 and 13 agree with those commanded at the UP/DWN input by sensing output voltage via an output voltage detector 28. Any error causes a high level signal at the FAULT output. A fault detector 32 also causes the FAULT output signal to go high upon sensing an over-temperature condition, a low $V_{DD}$ condition or upon any other fault condition which fault detector 32 is adapted to detect.

A lower gate driver 26 is coupled between timing circuit 23 and the gate of switch 13, and an upper gate driver 27 is coupled between timing circuit 23 and the gate of switch 11. A diode 15 has its anode connected to $V_{DD}$. The cathode of diode 15 is connected to one side of a capacitor 16 and to upper gate driver 27. The other side of capacitor 16 is connected to output terminal 18.

Since lower switch 13 is connected directly to circuit common, lower gate driver 26 can bias lower switch 13 to turn on and turn off using the relatively low CMOS voltages. However, the voltages required to control upper switch 11 track the voltage at output terminal 18. Thus, a voltage in excess of $+V_{DC}$ will be required to drive switch 11. This higher voltage is obtained by charging capacitor 16 from $V_{DD}$ when switch 13 is conducting. When switch 13 turns off, the charge on capacitor 16 provides a voltage to upper gate driver 27 which is greater than whatever the voltage happens to be at output terminal 18. Upper gate driver 27 is then able to control upper switch 11.

In HVIC 10, timing circuit 23 is at a relatively low voltage and cannot communicate directly with upper gate driver 27 which may be at a much higher voltage. Control signals are transmitted to upper gate driver 27 via a pair of pulsed current sources 30 and 31. Thus, timing circuit 23 may pulse current source 30 to signal the turning on of upper switch 11 and may pulse current source 31 to signal the turn off of switch 11. These pulses of current are detected by upper gate driver 27 which then biases upper switch 11 accordingly.

Figure 2:
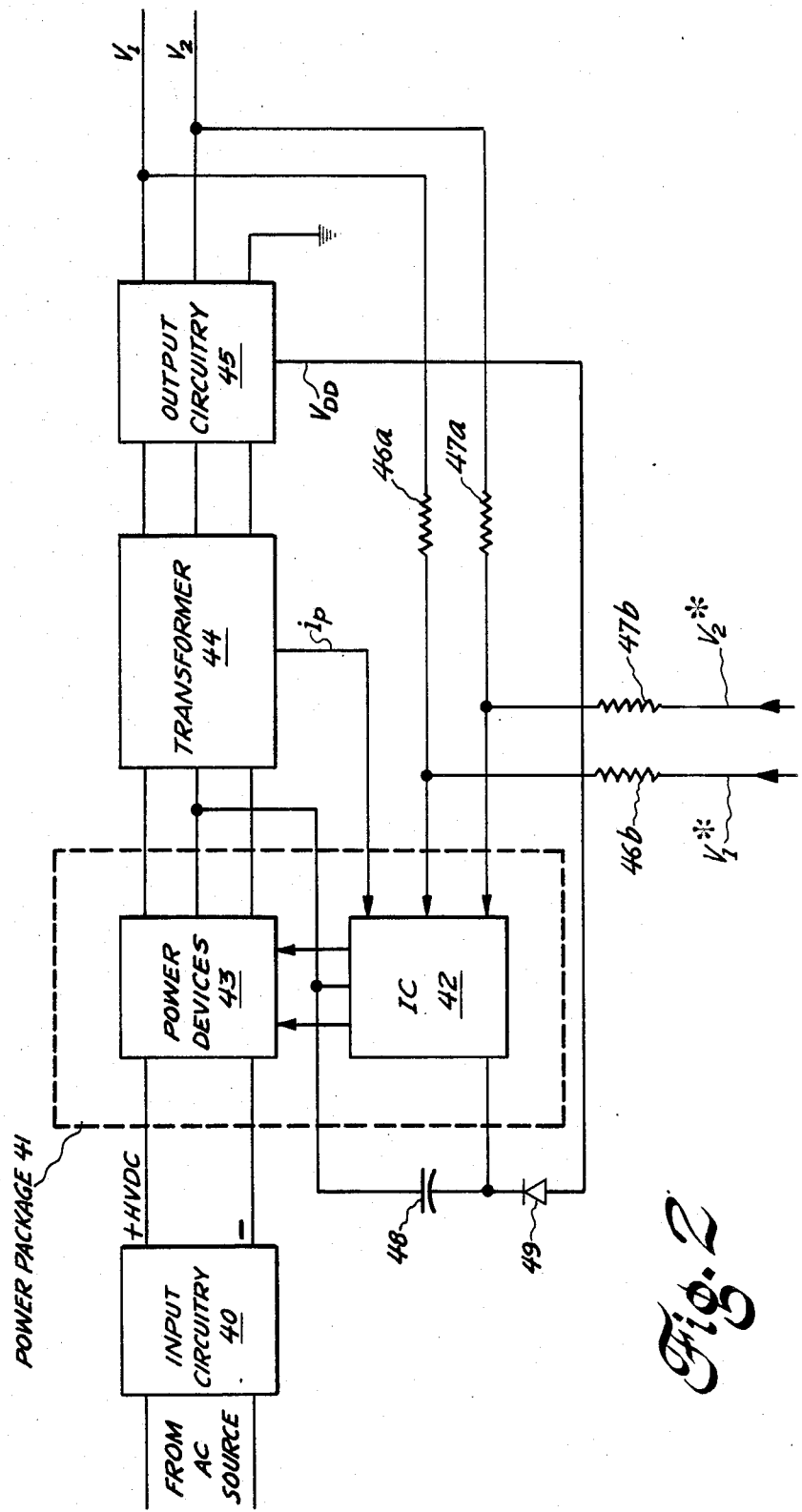
FIG. 2 is a schematic diagram of a DC power supply including the power package of the present invention.

Turning now to FIG. 2, a DC power supply of the invention including a power package which employs the gate driving scheme of FIG. 1 will be described. Input circuitry 40 receives AC power from an AC source (not shown) and provides a rectified and smoothed high level DC output voltage +HVDC. Input circuitry 40 may comprise, for example, a diode bridge rectifier and an LC filter.

A power package 41 includes power devices 43 and an integrated circuit (IC) 42. Power devices 43 are coupled to input circuitry 40 and to the inputs (e.g. primary winding) of a transformer 44. The outputs (e.g. secondary windings) of transformer 44 are coupled to output circuitry 45. Transformer 44 contains sensing means which is coupled to IC 42 for providing a current signal $i_p$ having a voltage proportional to the amplitude of the current flowing in the primary of transformer 44. Output circuitry 45 rectifies and smoothes the voltage(s) from the outputs of transformer 44 to provide a DC voltage $V_1$ and/or a DC voltage $V_2$, as well as a logic level voltage $V_{DD}$.

Figure 3:
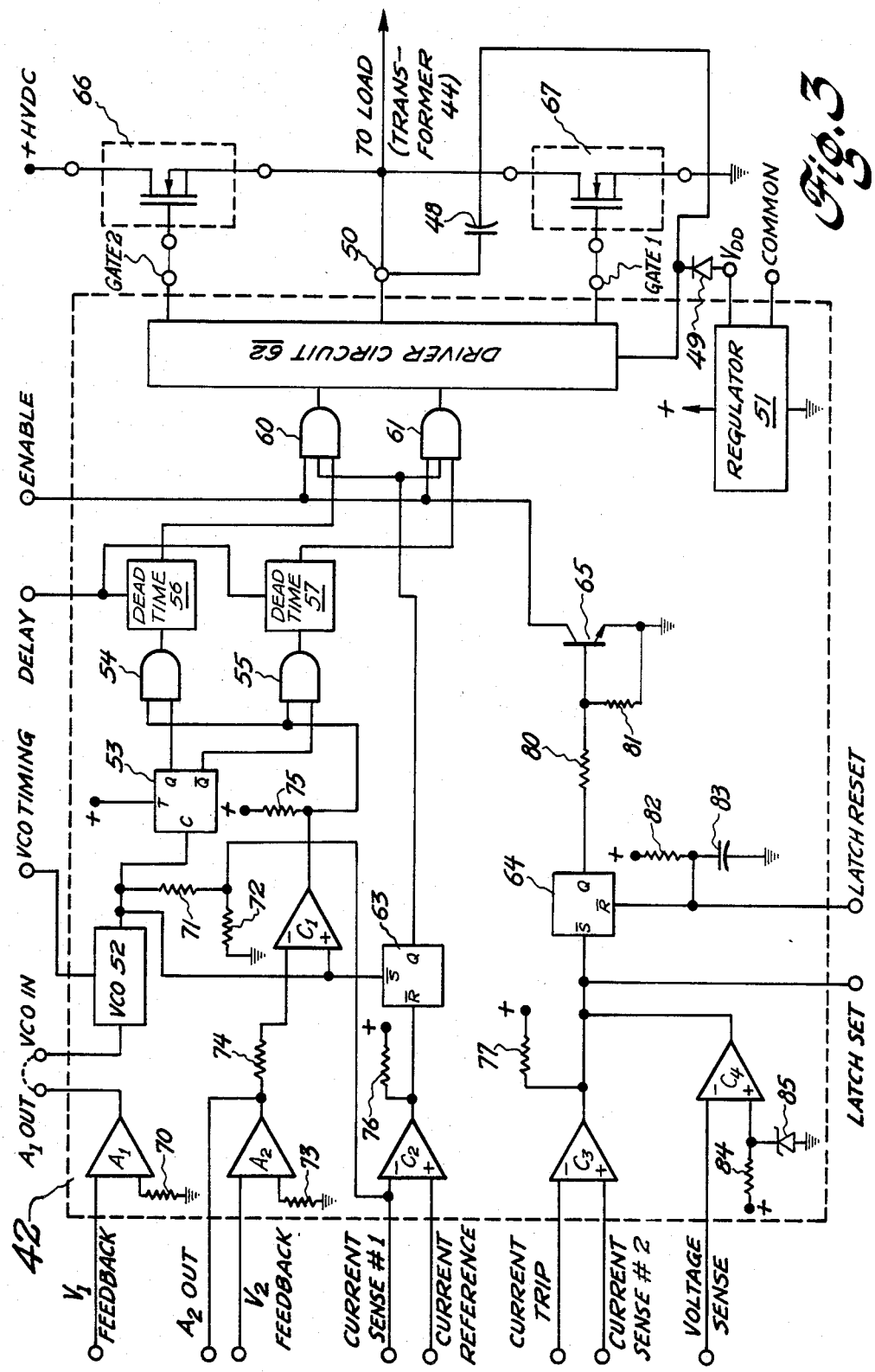
FIG. 3 is a schematic diagram of the high voltage integrated circuit of the present invention.

Voltages $V_1$ and/or $V_2$ are regulated by IC 42 (which is described in detail in conjunction with FIG. 3). The values of voltages $V_1$ and $V_2$ are fed back through resistors 46a and 47a, respectively. The feedback signals are combined with voltage commands $V_1^*$ and $V_2^*$, respectively, supplied via resistors 46b and 47b, respectively. The combined signals are coupled to IC 42. IC 42 regulates voltage $V_1$ by pulse-width modulating (PWM) the output signal from power devices 43 and regulates voltage $V_2$ by frequency modulation (FM) of that signal. Depending on the configurations of transformer 44 and output circuitry 45, there may be more than two distinct output voltages but only two of them are typically directly regulated by IC 42.

Various configurations of transformer 44 and output circuitry 45 may be employed to achieve the popular DC converter topologies for power supplies. PWM topologies and FM topologies may be used separately or together. Since IC 42 contains an HVIC driver circuit, power devices 43 may comprise a pair of high voltage semiconductor switches connected in a half-bridge configuration. An external capacitor 48 is charged from $V_{DD}$ through an external isolating diode 49 to provide the necessary voltage for driving the upper switch of the half-bridge. A single-ended circuit topology can also be achieved by using only a single semiconductor switch driven from a lower gate driver and leaving the upper gate driver and the external capacitor terminals unused.

By providing a single integrated circuit which may be used to implement many different power supply configurations, the IC may be produced in larger numbers, thus reducing the cost of each power supply. Since a relatively large fraction of chip area is occupied by the gate driver and the high voltage-level shifters (i.e. current sources) used in the gate driver, the increase in control complexity which allows a universal power supply chip has only a small impact on the overall size of the chip. Furthermore, different power levels (i.e. different values of +HVDC) may be accommodated by using different power devices in power package 41.

IC 42 is shown schematically in detail in FIG. 3. The circuit roughly is organized into first, second and third control loops, logic means, a driver circuit, a voltage regulator and protection means, although some circuit elements may be used for different functions by connecting them in various configurations. By employing multi-function circuit elements, the chip area for the control circuit is minimized.

The first control loop includes an operational amplifier $A_1$ and a voltage-controlled oscillator (VCO) 52 for generating a variable frequency ramp signal. Amplifier $A_1$ has one input connected to an input terminal designated $V_1$ FEEDBACK and the other input coupled to circuit common through a resistor 70. The output of amplifier $A_1$ is connected to a terminal $A_1$ OUT. VCO 52 has its voltage-controlled input connected to a terminal VCO IN. The frequency range for the output of VCO 52 can be fixed from an input connected to a VCO TIMING terminal, which is adapted to be coupled to circuit common through a capacitor (not shown). The capacitance of the capacitor determines the frequency range (i.e. minimum and maximum frequencies) of VCO 52.

The second control loop includes an operational amplifier $A_2$ and a comparator $C_1$. Amplifier $A_2$ has one input connected to input terminal $V_2$ FEEDBACK and the other input coupled to circuit common through a resistor 73. The output of amplifier $A_2$ is connected to terminal $A_2$ OUT and is coupled to the inverting input of comparator $C_1$ through a resistor 74. The noninverting input of comparator $C_1$ is connected to the output of VCO 52. A pullup resistor 75 is provided at the output of comparator $C_1$.

A third control loop includes a comparator $C_2$ and an RS flip-flop 63. The inverting input of comparator $C_2$ is connected to a terminal designated CURRENT SENSE #1 and is coupled to the output of VCO 52 through a voltage divider comprised of resistors 71 and 72. The noninverting input of comparator $C_2$ is connected to a CURRENT REFERENCE terminal. The output of comparator $C_2$ is connected to a pullup resistor 76 and to the NOT R input of flip-flop 63. The NOT S input of flip-flop 63 is connected to the output of VCO 52. Flip-flop 63 has a NAND latch configuration so that an input must drop to a low level to produce the desired output state.

IC 42 contains logic means for generating a pair of switching signals which includes a toggle flip-flop 53, an AND gate 54, an AND gate 55, a dead-time circuit 58 and a dead-time circuit 57. The clock input of flip-flop 53 is connected to the output of VCO 52, and the toggle input is tied to a high level signal. Thus, complementary outputs Q and NOT Q of flip-flop 53 reverse at each output pulse from VCO 52. The Q output is connected to one input of AND gate 54 and the NOT Q output is connected to one input of AND gate 55. The two remaining inputs of AND gates 54 and 55 are connected to the output of comparator $C_1$. Dead-time circuits 56 and 57 are connected to the outputs of AND gates 54 and 55, respectively. The dead-time circuits delay the rise to a high level of the output signals from AND gates 54 and 55 to insure that the upper and lower switches of the half-bridge are never conducting simultaneously. Each dead-time circuit 56 and 57 is connected to a terminal designated DELAY. A capacitor (not shown) connected from the DELAY terminal to circuit common determines the length of the dead-time delay.

The outputs of dead-time circuits 56 and 57 provide the pair of switching signals, which are coupled to an input of an AND gate 60 and an input of an AND gate 61, respectively. An input of each AND gate 60 and 61 is connected to an ENABLE terminal, and another input of each AND gate 60 and 61 is connected to the Q output of flip-flop 63.

The outputs of AND gates 60 and 61 are each connected to a driver circuit 62. Driver circuit 62 is similar to the circuit shown in FIG. 1 except that a separate switching signal, including a dead-time delay, is provided to driver circuit 62 for each switch of the half-bridge. A GATE 1 output terminal drives a lower switch 67 and a GATE 2 output terminal drives an upper switch 66. An output terminal 50 is connected to the output of the half-bridge. Driver circuit 62 is also connected to external diode 49 and to external capacitor 48 which provides a voltage to drive upper switch 66 as was previously described.

IC 42 also includes a regulator 51 which provides a logic level power supply for the control circuitry in IC 42. Regulator 51 has a terminal for connecting to a DC power source (e.g. $V_{DD}$ which may be provided by an auxiliary winding of the transformer) and a terminal for connecting to circuit common.

The circuit described thus far is adapted to operate with pulse-width modulation, frequency modulation and current mode control, both separately and together. Frequency modulation can be implemented using the portion of IC 42 described roughly as the first control loop, pulse-width modulation with the second control loop and current mode control with the third control loop.

Frequency modulation is used with a resonant DC to DC converter, such as the ones shown in U.S. Pat. No. 4,477,868 and U.S. Pat. No. 4,504,895 which are hereby incorporated by reference. To employ IC 42 in this configuration, $V_1$ FEEDBACK is coupled to the regulated voltage output and to a voltage command in the manner shown in FIG. 2. $V_1$ FEEDBACK is coupled to $A_1$ OUT through a capacitor and a resistor in series (not shown) such that amplifier $A_1$ and the capacitor and resistor comprise a proportional-integral controller. By connecting $A_1$ OUT to VCO IN, as shown by the dashed line of FIG. 3, the output frequency of VCO 52 changes in accordance with the error between the output voltage and its commanded value. The outputs of flip-flop 53 toggle at the output frequency of VCO 52. The $A_2$ OUT terminal is tied to circuit common (not shown) so that the output signal from comparator $C_1$ is high and AND gates 54 and 55 transmit the output signals of flip-flop 53 with a 100% duty ratio. Thus, the half-bridge is driven at the proper frequency for regulating the output voltage of the resonant converter.

Pulse-width modulation can be employed with a forward converter, in which the PWM signal is supplied to the transformer primary winding and the voltage on the transformer secondary winding is half-wave rectified and filtered to provide the DC output voltage. The transformer of a forward converter typically also includes a reset winding. The forward converter usually has a single-ended configuration (i.e. a single power switch) and the conduction of the switch is pulse-width modulated to control the output voltage. A half-bridge configuration can alternatively be used, in which case the output of the half-bridge is pulse-width modulated.

IC 42 and power switch 67 of FIG. 3 may be employed in a forward converter in the following manner. $V_2$ FEEDBACK is coupled to the PWM controlled output voltage $V_2$ and to a commanded voltage $V_2^*$. $V_2$ FEEDBACK is coupled to $A_2$ OUT through a capacitor and a resistor in series (not shown) such that amplifier $A_2$ is part of a proportional-integral controller, the output of which provides a reference level for controlling the duty ratio of the signal provided to the transformer primary. VCO IN is connected to a predetermined DC voltage source (e.g. $V_{DD}$) and VCO TIMING is connected to a fixed capacitor such that a VCO output signal having a constant frequency is provided to flip-flop 53 and to comparator $C_1$.

IC 42 is also adapted to control two DC output voltages simultaneously, one voltage by PWM and the other by FM. In this configuration, terminal $A_1$ OUT is connected to terminal VCO IN, terminal $V_1$ FEEDBACK is coupled to a frequency controlled output voltage ($V_1$) and $V_2$ FEEDBACK is coupled to a pulse-width controlled output voltage ($V_2$). One example of a DC to DC converter having a frequency controlled output and a pulse-width controlled output is described in copending application of Steigerwald, Ser. No. 793,430, filed Oct. 31, 1985, now U.S. Pat. No. 4,628,426, issued Dec. 9, 1986, of common assignment, which is hereby incorporated by reference. In that converter, the output voltage from a tightly-coupled secondary winding is controlled by PWM and the output voltage from a loosely-coupled secondary winding and a resonant capacitor connected in parallel is controlled by FM. Another example of a converter with separate PWM and FM controlled output voltages is described in Kohno and Kuwabara, *Single-Ended DC-to-DC Converter with Two Individually Controlled Outputs*, FUJITSU Scientific and Tech. J. (March, 1980), which includes a buck circuit operating in a continuous inductor current mode and a buck-boost circuit operating in a discontinuous mode.

The third control loop of IC 42 can be used to implement current mode control, which is described, for example, in Deisch, *Simple Switching Control Method Changes Power Converter into a Current Source*, Power Electronics Specialists Conf. (1978), which is also hereby incorporated by reference. To implement current mode control using IC 42, the CURRENT SENSE #1 terminal receives a voltage signal proportional to the output current of the converter from a current sensor (not shown), The CURRENT REFERENCE terminal receives a reference signal which determines the peak amplitude of the output current. The reference signal may be provided by amplifier $A_1$ by connecting $V_1$ FEEDBACK to the converter output and connecting the $A_1$ OUT terminal to the CURRENT REFERENCE terminal instead of the VCO IN terminal. VCO 52 is configured to provide a constant frequency output signal for toggling flip-flop 53. The VCO signal is coupled to the inverting input of comparator $C_2$ through the voltage divider comprised of resistors 71 and 72 for providing a stabilizing ramp which improves the stability of current mode control. When the stabilized, sensed current signal equals the current reference signal, the output signal of comparator $C_2$ switches low, thus resetting flip-flop 63 and switching the outputs of AND gates 60 and 61 to a low level. At the beginning of the next cycle, flip-flop 63 is set by the output signal from VCO 52 to allow current to again build-up.

IC 42 also includes protection circuitry for inhibiting the operation of driver circuit 62 during various fault conditions. A comparator $C_3$ has CURRENT TRIP and CURRENT SENSE #2 input terminals. The output of comparator $C_3$ is connected to a pullup resistor 77 and to the NOT S input of an RS flip-flop 64 (also a NAND latch). A comparator $C_4$ has its inverting input connected to a VOLTAGE SENSE input terminal and its noninverting input connected to the junction between a resistor 84 and a zener diode 85 which are connected in series between the chip power supply and circuit common. The output of comparator $C_4$ is connected to the NOT S input of flip-flop 64. A LATCH SET input terminal provides an external connection to the NOT S input of flip-flop 64.

A resistor 82 and a capacitor 83 are connected in series between the chip power supply and circuit common. Their junction is connected to the NOT R input of flip-flop 64 and to a LATCH RESET terminal. Resistor 82 and capacitor 83 comprise a power-up reset circuit which resets flip-flop 64 when power is first applied to IC 42.

The Q output of flip-flop 64 is coupled to the base of a transistor 65 through a resistor 80. The collector of transistor 65 is connected to the ENABLE terminal. The emitter of transistor 65 is connected to circuit common and is coupled to the base of transistor 65 through a resistor 81.

In operation, while the Q output signal from flip-flop 64 is low, transistor 65 is turned off and circuit operation is not affected. However, when the NOT S input signal to flip-flop 64 goes low, the Q output signal goes high and circuit operation is disabled by conduction of transistor 65. Thus, if the sensed current signal at the CURRENT SENSE #2 terminal exceeds a reference at the CURRENT TRIP terminal, converter operation is disabled until a low signal is applied at the LATCH RESET terminal or until power is turned off and reapplied.

Overvoltage protection is provided by comparator $C_4$. When the voltage at the VOLTAGE SENSE terminal exceeds the voltage across zener diode 85, flip-flop 64 will latch to its disable state. Other protection functions (e.g. overtemperature protection) can be implemented either on chip or off chip by circuitry connected to the LATCH SET terminal.

The foregoing describes low cost DC power supplies using a universal control chip which is adapted for high volume production. The chip contains both the universal control circuit and high voltage gate drivers. Control circuit elements have multiple uses for implementing different converter topologies with a minimum of chip size. Single-ended and half-bridge configurations are possible at a wide variety of power levels.

While preferred embodiments of the present invention have been shown and described herein, it will be obvious that such embodiments are provided by way of example only. Numerous variations, changes and substitutions will occur to those skilled in the art without departing from the spirit of the invention. Accordingly, it is intended that the appended claims cover all such variations as fall within the spirit of the invention.

What is claimed is:

1. An integrated circuit for driving the converter switches of and controlling at least one output voltage of a DC to DC converter, said integrated circuit comprising:
    a first control loop including a first amplifier, a voltage-controlled oscillator, and connection means for permitting the output of said first amplifier to be coupled with the input of said voltage-controlled oscillator, the output of said voltage-controlled oscillator comprising the output of said first control loop;
    a second control loop including a second amplifier coupled to a first comparator, said first comparator also being coupled to the output of said voltage-controlled oscillator, the output of said comparator comprising the output of said second control loop;
    logic means connected to the output of each of said first and second control loops, respectively, for generating a pair of switching signals at first and second outputs thereof, respectively, each of said switching signals having a frequency in accordance with the output signal from said first control loop and having a duty ratio in accordance with the output signal from said second control loop; and
    a driver circuit coupled to the first and second outputs of said logic means, said driver circuit having outputs for driving a first converter switch and a second converter switch, said driver circuit adapted to be coupled to an external capacitor for providing a voltage sufficient to drive said second converter switch.

2. The integrated circuit of claim 1 further comprising a pair of AND gates, each coupling a respective switching signal to said driver circuit, each AND gate including an input responsive to an enable signal.

3. The integrated circuit of claim 2 further comprising a third control loop including a flip-flop and a second comparator coupled to said flip-flop, said flip-flop also being coupled to said output of said voltage-controlled oscillator, the output of said flip-flop being connected to an input of each of said AND gates, said second comparator adapted to be coupled to said first amplifier.

4. The integrated circuit of claim 2 further comprising a protection circuit including:
    sensing means for detecting whether predetermined parameters exceed predetermined limits;
    a latch coupled to said sensing means for switching from an initial state to a disable state when said sensing means indicates that one of said predetermined parameters has exceeded its predetermined limits, said latch being reset to said initial state in response to a reset signal; and
    disabling means coupled to said latch and to said pair of AND gates for removing said enable signal from said pair of AND gates when said latch is in said disable state.

5. The integrated circuit of claim 2 further comprising a voltage regulator for supplying regulated DC voltage for said integrated circuit.

6. A power package for a DC power supply comprising:
    at least one power switching device for coupling to a power supply transformer and to a DC voltage supply; and
    an integrated circuit connected to said power switching device and adapted to be coupled to at least one output of said DC power supply, said integrated circuit including:
        a first control loop including a first amplifier, a voltage-controlled oscillator, and connection means for permitting the output of said first amplifier to be coupled with the input of said voltage-controlled oscillator, the output of said voltage-controlled oscillator comprising the output of said first control loop;
        a second control loop including a second amplifier coupled to a first comparator, said first comparator also being coupled to the output of said voltage-controlled oscillator, the output of said comparator comprising the output of said second control loop;
        logic means connected to the output of each of said first and second control loops, respectively, for generating a pair of switching signals at first and second outputs thereof, respectively, each of said switching signals having a frequency in accordance with the output signal from said first control loop and having a duty ratio in accordance with the output signal from said second control loop; and
        a driver circuit coupled to the first and second outputs of said logic means, said driver circuit adapted to drive said power switching devices and adapted to be coupled to an external capacitor for providing a voltage sufficient to drive a power switching device not referenced to circuit common.

7. The power package of claim 6 wherein said integrated circuit further comprises a pair of AND gates, each AND gate coupling a respective switching signal to said driver circuit, each AND gate including an input responsive to an enable signal.

8. The power package of claim 7 wherein said integrated circuit further comprises a third control loop including a filp-flop and a second comparator coupled to said flip-flop, said flip-flop also being coupled to said output of said voltage-controlled oscillator, the output of said flip-flop being connected to an input of each of said AND gates, said second comparator adapted to be coupled to said first amplifier.

9. The power package of claim 7 wherein said integrated circuit further comprises a protection circuit including:
    sensing means for detecting whether predetermined parameters exceed predetermined limits;
    a latch coupled to said sensing means for switching from an initial state to a disable state when said sensing means indicates that one of said predetermined parameters has exceeded its predetermined limits, said latch being reset to said initial state in response to a reset signal; and
    disabling means coupled to said latch and to said pair of AND gates for removing said enable signal from said pair of AND gates when said latch is in said disable state.

10. The power package of claim 7 further comprising a voltage regulator for supplying regulated DC voltage for said integrated circuit.

* * * * *